US006563040B2

United States Patent
Hayden et al.

(10) Patent No.: US 6,563,040 B2
(45) Date of Patent: May 13, 2003

(54) STRUCTURE FOR SUPPORTING A PHOTOVOLTAIC MODULE IN A SOLAR ENERGY COLLECTION SYSTEM

(75) Inventors: Herbert T. Hayden, Tempe, AZ (US); Jefferson G. Shingleton, Auburn, NY (US)

(73) Assignee: Pinnacle West Capital Corporation, Phoenix, AZ (US)

( * ) Notice: Subject to any disclaimer, the term of this patent is extended or adjusted under 35 U.S.C. 154(b) by 0 days.

(21) Appl. No.: 09/976,581

(22) Filed: Oct. 11, 2001

(65) Prior Publication Data

US 2003/0070705 A1 Apr. 17, 2003

(51) Int. Cl.[7] .............................. H01L 31/042; F24J 2/38
(52) U.S. Cl. ....................................... 136/244; 126/600
(58) Field of Search ................................ 136/244, 246, 136/251, 291; 126/600, 605, 573, 575; 52/173.3; 248/127, 156, 371, 393, 176.1

(56) References Cited

U.S. PATENT DOCUMENTS

| | | | | |
|---|---|---|---|---|
| 3,977,773 A | * | 8/1976 | Hubbard | 359/853 |
| 4,108,154 A | * | 8/1978 | Nelson | 126/576 |
| 4,245,895 A | * | 1/1981 | Wildenrotter | 359/848 |
| 4,832,001 A | | 5/1989 | Baer | 126/425 |
| 4,966,631 A | | 10/1990 | Matlin et al. | 136/244 |
| 5,022,929 A | * | 6/1991 | Gallois-Montbrun | 136/246 |
| 5,143,556 A | | 9/1992 | Matlin | 136/244 |
| 5,228,924 A | | 7/1993 | Barker et al. | 136/246 |
| 5,325,844 A | * | 7/1994 | Rogers et al. | 126/605 |
| 6,058,930 A | | 5/2000 | Shingleton | 126/600 |
| 6,089,224 A | | 7/2000 | Poulek | 126/576 |
| 6,294,725 B1 | * | 9/2001 | Hirschberg et al. | 136/256 |

FOREIGN PATENT DOCUMENTS

GB 2155615 A * 9/1985

* cited by examiner

Primary Examiner—Nam Nguyen
Assistant Examiner—Brian L Mutschler
(74) Attorney, Agent, or Firm—Lowell W. Gresham; Jordan M. Meschkow; Charlene R. Jacobsen (57) ABSTRACT

A tilted single-axis tracking system (20) for collecting solar energy includes a structure (22) for supporting an array (26) of photovoltaic (PV) modules (24) above a surface (28). The structure (22) includes a frame (34) having first and second legs (40, 42) configured to extend upwardly from the surface (28) and join at an apex (54). A base tensioning member (44) of the frame (34) is interposed between the first and second legs (40, 42). A torque tube (36) is pivotally retained by the frame (34) at the apex (54) and is configured for attachment of the array (26) of PV modules (24). A foot member (38) pivotally retains a tube end (60) of the torque tube (36) and is configured to rest on the surface (22). A first tensioning member (106) is coupled between the foot member (38) and the first leg (40), and a second tensioning member (108) is coupled between the foot member (38) and the second leg (42). A pre-tensioning member (110) extends from the apex (54) of the frame (34) and is configured for attachment to the surface (28). In an alternative embodiment, the pre-tensioning member (110) is omitted and pre-tensioning members (152) extend from each of the first and second legs (40, 42) and the foot member (38) and are configured for attachment to the surface (28).

19 Claims, 5 Drawing Sheets

STRUCTURE FOR SUPPORTING A PHOTOVOLTAIC MODULE IN A SOLAR ENERGY COLLECTION SYSTEM

TECHNICAL FIELD OF THE INVENTION

The present invention relates to the field of solar energy collection systems. More specifically, the present invention relates to a stable structure for supporting an array of photovoltaic modules of a tilted single-axis tracking solar energy collection system.

BACKGROUND OF THE INVENTION

Solar energy collection systems are used for a variety of purposes, for example, as utility interactive power systems, power supplies for remote or unmanned sites, and cellular phone switch-site power supplies. An array of energy conversion modules, such as, photovoltaic (PV) modules, in a solar energy collection system can have a capacity from a few kilowatts to a hundred kilowatts or more, depending upon the number of PV modules, also known as PV panels, used to form the array, and can be installed wherever there is a reasonably flat area with exposure to the sun for significant portions of the day.

In general terms, a solar energy collection system has an array of PV modules arranged in the form of rows and mounted on a structure. The PV modules are oriented to optimize the PV module energy output to suit the particular PV system design requirements. PV modules may be mounted on a fixed structure, with a fixed orientation and fixed tilt, or may be mounted on a tracking structure. The tracking structure generally includes a rotatable support structure, which supports the PV modules and rotates on one or more specific axes. The tracking structure further generally includes one or more drive mechanisms that rotate the support structure around the one or more axes, either continuously or on an intermittent basis, to aim the PV modules toward the sun as the sun moves across the sky during the day and as the sun path moves in the sky during the year.

In solar energy collection systems, tracking the sun can lead to a significant increase in annual radiation falling on the tracked surface, thus an increase in efficiency, relative to a fixed structure. One such apparatus is a tracking structure that reorients the PV modules by mechanical tracking on two axes. The two-axis tracking solar energy collection structure allows the PV modules to face directly toward the sun regardless of the daily movement of the sun and the seasonal variation in the path of that movement. However, the structure for a two-axis system is more complex, costly, and prone to breakdown than a single-axis tracking solar energy collection structure.

A single-axis tracking solar energy collection structure represents a reasonable compromise between the fixed structure and the two-axis structure. That is, a single-axis tracking structure achieves the benefit of an increase in efficiency over a fixed structure without the undesirable complexity and cost of a two-axis tracking structure.

A single-axis tracking structure moves the PV modules around a single axis, and therefore approximates tracking of the actual position of the sun at any time. Usually, the rows of PV modules are arranged with their axes disposed in a north-south direction, and the drive mechanism gradually rotates the rows of PV modules throughout the day from an east-facing direction in the morning to a west-facing direction in the afternoon. The rows of PV modules are brought back to the east-facing orientation for the next day. A single-axis tracking structure may rotate around an axis that is either horizontal or tilted on an angle relative to horizontal that corresponds to the latitude of the location. However, tilted single-axis tracking structures generally achieve a performance that is improved relative to horizontal single-axis tracking structures because they place the array of PV modules on average closer to perpendicular relative to the path of the sun.

A particular type of tilted single-axis tracking structure makes use of the concept of polar axis tracking, utilized extensively in satellite antennae and telescope mounting. A polar axis tracking structure orients the PV modules toward the sun by rotating around an axis that is parallel to the axis of rotation of the earth. Polar single-axis tracking structures come closest to achieving the performance of two-axis tracking structures without the complexity and cost associated with tracking a second axis.

Polar single-axis tracking structures and other tilted single-axis tracking structures have been manufactured for many years. Unfortunately, many of the prior art structures suffer from a variety of problems. For example, some tilted single-axis tracking structures are designed for mounting on a pole that is normally embedded in the ground. A problem with such an approach is the structural inefficiency of a single-point pole support. The single point attachment leads to high bending stresses in the support structure and pole and is not very stable in elevated wind conditions.

The structural inefficiencies of the prior art devices under wind conditions is exacerbated by the trend toward solar energy collection systems having solar collection capacities in excess of three kilowatts. A capacity of greater than three kilowatts is a convenient size for many applications, such as, in a single residence application. However, to meet such capacities, the size of the array of PV modules has increased relative to earlier systems. Unfortunately, the single point attachment of the single pole systems has difficulty in supporting the increased size and weight of the larger arrays under wind load.

Other prior art single-axis tracking structures employ a tripod-like structure for supporting the PV modules. The structure includes a single footing and an A-frame. A torque tube is balanced by the single footing at one end of the tube, and the A-frame at the other end of the tube. PV modules are supported by and rotate about the torque tube. Unfortunately, this tripod structure requires three independent formal foundation elements, thus increasing installation complexity and consequently, cost. In addition, the independent nature of the structure legs and foundations leads to an undesirable transfer of a variety of structural loads to the ground. As such, winds and other weather phenomena can cause enormous torque loads on the structure and result in a loss of stability of the tracking structure, possibly leading to failure of the structure and/or drive mechanism.

In an attempt to counter the loss of stability and to accommodate larger PV arrays, the structure, foundation elements, drive mechanism, and so forth have increased in complexity, size, and weight. A heavy structural steel pedestal, typically embedded in a large concrete base or foundation, is needed to withstand the loads on the above ground structure. Typical installations have become sufficiently large so that cranes are required to move and install the structural steel, cement is trucked in to support the steel framework, and multiple visits to the site by multiple workers are required to complete the installation. Unfortunately, the construction of such a large structure is quite expensive and difficult in the typical remote locations where such systems are most advantageous.

SUMMARY OF THE INVENTION

Accordingly, it is an advantage of the present invention that a structure for supporting energy conversion modules is provided.

It is another advantage of the present invention that a structure is provided having a geometry that leads to an efficient transfer of structural loads to the ground.

Another advantage of the present invention is that a structure is provided that is stable in wind and other weather phenomena.

Yet another advantage of the present invention is that a structure is provided that is readily installed in a single site visit with conventional equipment, and requiring little site preparation and excavation.

The above and other advantages of the present invention are carried out in one form by a structure for supporting an energy conversion module above a surface. The structure includes a frame having a first leg, a second leg, and a base tensioning member. The first and second legs are configured to extend upwardly from the surface and join at an apex, and the base tensioning member is interposed between the first and second legs. A torque tube is pivotally retained by the frame at the apex and is configured for attachment of the energy conversion module. A foot member rotatably retains a tube end of the torque tube and is configured to contact the surface. A first tensioning member is coupled between the foot member and the first leg, and a second tensioning member is coupled between the foot member and the second leg. A pre-tensioning member extends from the apex of the frame and is configured for attachment to the surface.

The above and other advantages of the present invention are carried out in another form by a structure for supporting an energy conversion module above a surface. The structure includes a frame having a first leg, a second leg, and a base tensioning member. The first and second legs are configured to extend upwardly from the surface and join at an apex, and the base tensioning member is interposed between the first and second legs. A torque tube is pivotally retained by the frame at the apex and is configured for attachment of the energy conversion module. A foot member rotatably retains a tube end of the torque tube and is configured to contact the surface. A first tensioning member is coupled between the foot member and the first leg, and a second tensioning member is coupled between the foot member and the second leg. The structure further includes pre-tensioning members configured for attachment to the surface, one each of the pre-tensioning members extending from one each of the first leg, the second leg, and the foot member.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
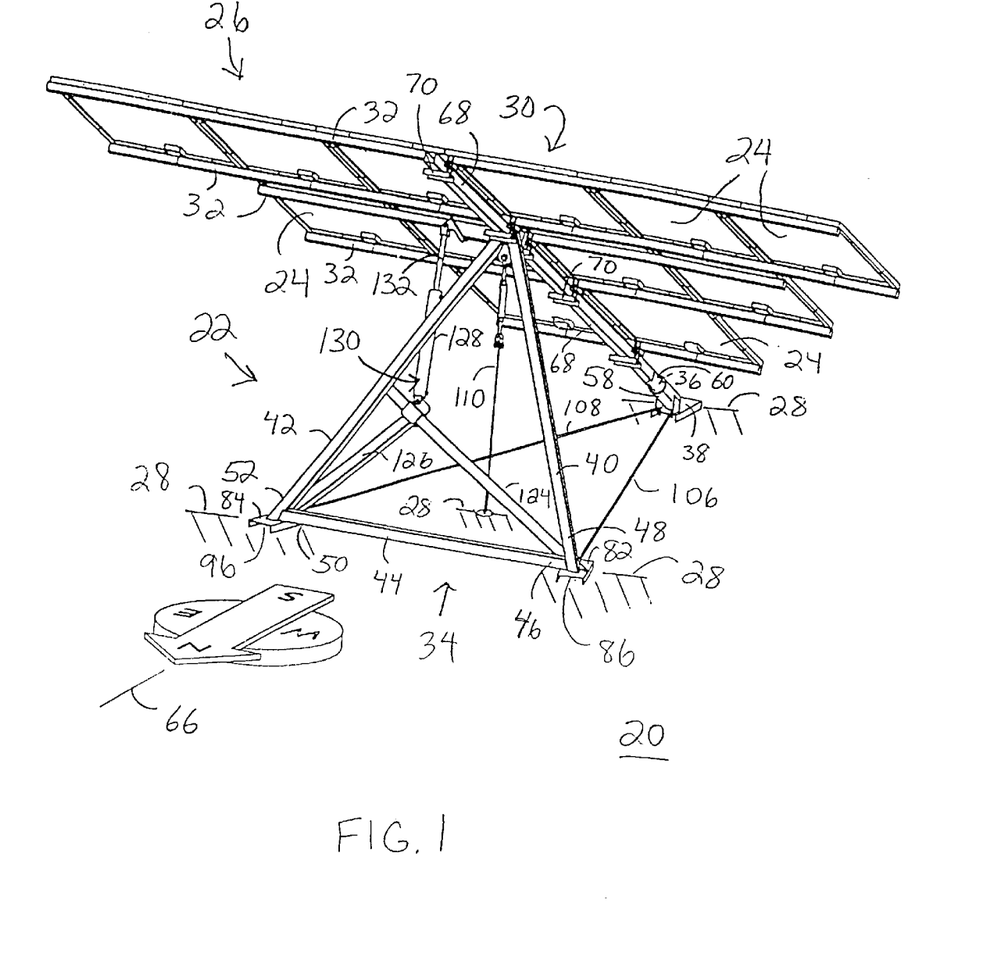
FIG. 1 shows a perspective view of a tilted single-axis tracking system for collecting solar energy in accordance with a preferred embodiment of the present invention.

FIG. 1 shows a perspective view of a tilted single-axis tracking system 20 for collecting solar energy in accordance with a preferred embodiment of the present invention. Tilted single-axis tracking system 20 generally includes a structure 22 and energy conversion modules 24 arranged in an array 26. Structure 22 is configured to support energy conversion modules 24 above a surface 28 of the earth at an installation site. Surface 28 can be soil, sand, rock, clay, or a combination thereof. In addition, structure 22 advantageously supports energy collection modules that have a tracking surface in excess of two hundred square feet of tracking surface area in order to adequately meet the capacity demands of remote locations, single residences, and so forth.

In an exemplary embodiment, array 26 includes three rows of energy conversion modules 24 forming a total of twelve modules, each of which has approximately twenty-five square feet of tracking surface 30. Thus, array 26 has a total surface area of tracking surface 30 of approximately three hundred square feet. Energy conversion modules 24 generate approximately twelve Watts of electrical energy per square foot of surface area of tracking surface 30. As such, tilted single-axis tracking system 20 has the capacity to generate approximately 3.6 kW of power, which is sufficient for powering a remote or unmanned site, a single residence, a cellular phone switchsite, and so forth.

Those skilled in the art will appreciate that an energy conversion module 24 incorporates at least one device, e.g., a photovoltaic cell, configured to convert light into electrical energy. For the remainder of this document, energy conversion modules 24 are assumed to be photovoltaic (PV) modules 24. However, the use of alternative energy conversion modules 24 does not depart from the spirit of the present invention.

As shown, ribs 32 retain PV modules 24 in a number of rows to form array 26. Electrically connected PV modules 24 of array 26 are arranged in a sawtooth configuration, in which the number of PV modules 24 per row decreases from the vertically highest row to the vertically lowest row of array 26. This sawtooth configuration allows system 20 to have a greater tilting range without the risk of PV modules 24 striking surface 28. Those skilled in the art will recognize that array 26 can include a number PV modules 24 arranged in a number of configurations to suit the particular system design requirements of single-axis tracking system 20. In addition, PV modules 24 may have a larger or smaller-tracking surface than that which was described above. As such, array 26 may include more or less PV modules 24 than what is shown, or may include a single photovoltaic module.

Figure 2:
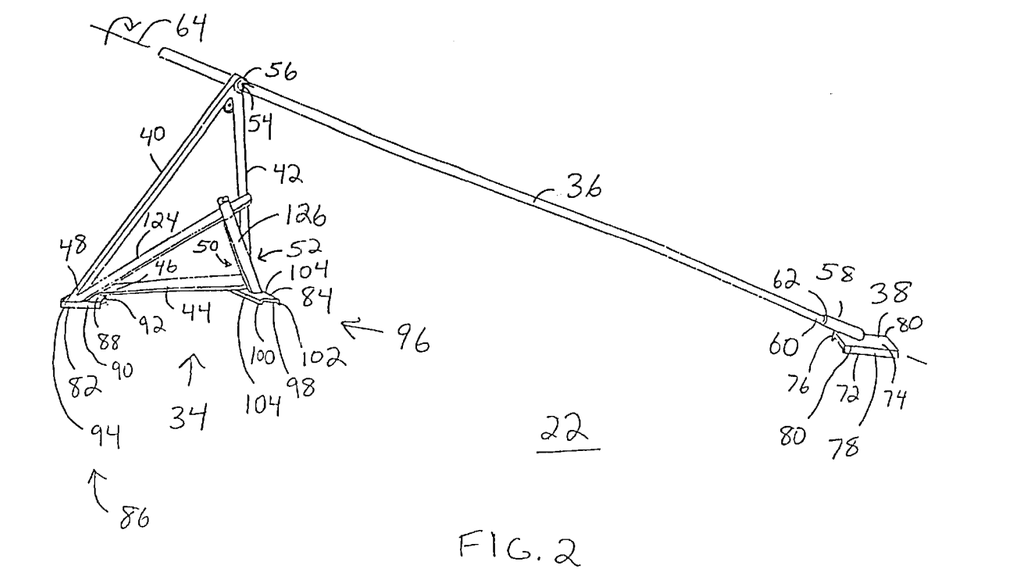
FIG. 2 shows a perspective view of a frame, a torque tube, and a first foot member of a structure of the tilted single-axis tracking system.

Referring to FIGS. 1–2, FIG. 2 shows a perspective view of a frame 34, a torque tube 36, and a first foot member 38 of structure 22 of tilted single-axis tracking system 20. Structure 22 forms a stable platform on which to attach and support PV modules 24. In addition, structure 22 is configured to allow the complete installation of tilted single-axis tracking system 20 in a single site visit. This single site visit installation is made possible by the simple design of system 20, by eliminating the need for concrete foundations, and by configuring system 20 to be installed with conventional utility line equipment.

Frame 34 has a first leg 40, a second leg 42, and a base tensioning member 44 interposed between first and second legs 40 and 42, respectively. A first end 46 of base tensioning member 44 is coupled to a first leg end 48 of first leg 40. Similarly, a second end 50 of base tensioning member 44 is coupled to a second leg end 52 of second leg 42. First and second legs 40 and 42, respectively, are configured to extend upwardly from surface 28 and join at an apex 54 of frame 34.

Torque tube 36 is pivotally retained by frame 34 at apex 54. That is, torque tube 36 is directed through a bearing 56 at apex 54, which allows torque tube 36 to pivot. First foot member 38 includes a receptacle 58 into which a tube end 60 of torque tube 36 is positioned. Receptacle 58 also includes a bearing 62, which allows tube end 60 of torque tube 36 to be rotatably retained in first foot member 38. Bearings 56 and 62 enable torque tube 36 to rotate about a longitudinal axis 64 of torque tube 36.

Torque tube 36 is oriented such that longitudinal axis 64 is roughly parallel to a north-south axis 66 of the earth and is configured for attachment of array 26 of PV modules 24. For example, square or rectangular tube sections 68 surround and attach to torque tube 36. Brackets 70 secure ribs 32 to tube sections 68. As torque tube 36 rotates about longitudinal axis 64, array 26 correspondingly rotates so that tracking surface 30 of PV modules 24 rotates from an east-looking orientation (not shown), through a mid-day orientation (shown in FIG. 1), and to a west looking orientation (shown in FIG. 5) to most directly face the sun. Those skilled in the art will recognize that torque tube 36 may be oriented at an angle that is not parallel to north-south axis 66 to bias the system toward optimal energy collection in either the summer or winter, or to simplify the structure and/or the installation of the structure.

First foot member 38 is configured to rest on, but not be secured to, surface 28. In a preferred embodiment, first foot member 38 is a channel section 72 having a base 74, and first and second sides 76 and 78, respectively, extending from longitudinal edges 80 of base 74. When in place, longitudinal edges 80 are aligned with north-south axis 66. First and second sides 76 and 78 are configured to extend toward surface 28 to provide friction, and resistance to slippage, between first foot member 38 and surface 28.

First leg end 48 of first leg 40 and second leg end 52 of second leg 42 are also configured rest on, but not be secured to surface 28. In particular, a second foot member 82 is coupled to first leg end 48 of first leg 40, and a third foot member 84 is coupled to second leg end 52 of second leg 42. Second and third foot members 82 and 84, respectively, are constructed similarly to first foot member 38. That is, second foot member 82 is a channel section 86 having a base 88, and first and second sides 90 and 92, respectively, extending from longitudinal edges 94 of base 88. Third foot member 84 is a channel section 96 having a base 98, and first and second sides 100 and 102, respectively, extending from longitudinal edges 104 of base 98. First and second sides 90 and 92 of second foot member 82 and first and second sides 100 and 102 of third foot member 84 are configured to extend toward surface 28 to provide friction, and resistance to slippage, between second and third foot members 82 and 84, respectively, and surface 28.

Structure 22 further includes a first tensioning member 106 coupled between first foot member 38 and first leg 40. A second tensioning member 108 is coupled between first foot member 38 and second leg 42. In a preferred embodiment, first tensioning member 106 is a rod, cable, or other tension member coupled between first foot member 38 and second foot 82 coupled to first leg end 48 of first leg 40. Likewise, second tensioning member 108 is a rod, cable, or other tension member coupled between first foot member 38 and third foot member 84 coupled to second leg end 52 of second leg 42.

Longitudinal edges 94 of second foot member 82 define a longitudinal dimension of channel section 86. Longitudinal edges 94 are axially aligned with first tensioning member 106. In addition, longitudinal edges 104 of third foot member 84 define a longitudinal dimension of channel section 96. Longitudinal edges 104 are axially aligned with second tensioning member 108.

Figure 3:
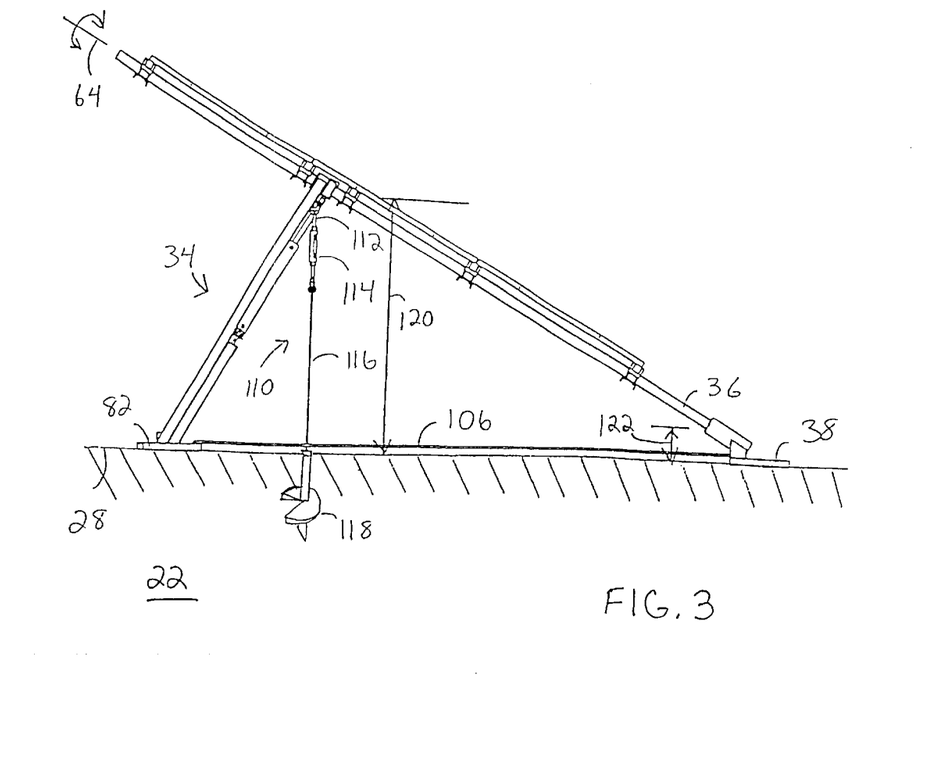
FIG. 3 shows a side view of the structure of FIG. 2.

Referring to FIG. 3 in connection with FIGS. 1–2, FIG. 3 shows a side view of structure 22. Structure 22 further includes a pre-tensioning member 110 extending from apex 54 of frame 34 and configured for attachment to surface 28. Pre-tensioning member 110 includes a cable 112, attached to frame 34 at apex 54, that joins a turnbuckle 114. Another cable 116 extends from turnbuckle 114 and attaches to a helical ground anchor 118, or other ground anchor mechanism. Ground anchor 118 secures pre-tensioning member 110 to surface 28. Pre-tensioning member 110 is configured to extend from apex 54 to surface 28 approximately vertically relative to horizontal.

Apex 54 of frame 34 exhibits a first height 120 relative to surface 28, and receptacle 58 exhibits a second height 122 relative to surface 28. Second height 122 is configured to be less than first height 120 so that a plane, i.e. tracking surface 28 (FIG. 1), of PV array 26 is inclined relative to horizontal. In an exemplary embodiment, longitudinal axis 64 is tilted approximately thirty degrees from horizontal. In this tilted configuration, system 20 is a polar single-axis tracking system when located at latitudes of approximately thirty degrees. At other latitudes, the tilt angle between horizontal and longitudinal axis 64 may be set to equal the latitude at the installation site to produce a polar single-axis tracking system.

It should be readily apparent that structure 22 is oriented to accommodate locations that are north of the equator. That is, tracking surface 28 is inclined to face generally southward. When tilted single-axis tracking system is installed in locations that are south of the equator, the orientation of structure 22 is reversed so that tracking surface 28 is inclined to face generally northward.

Figure 4:
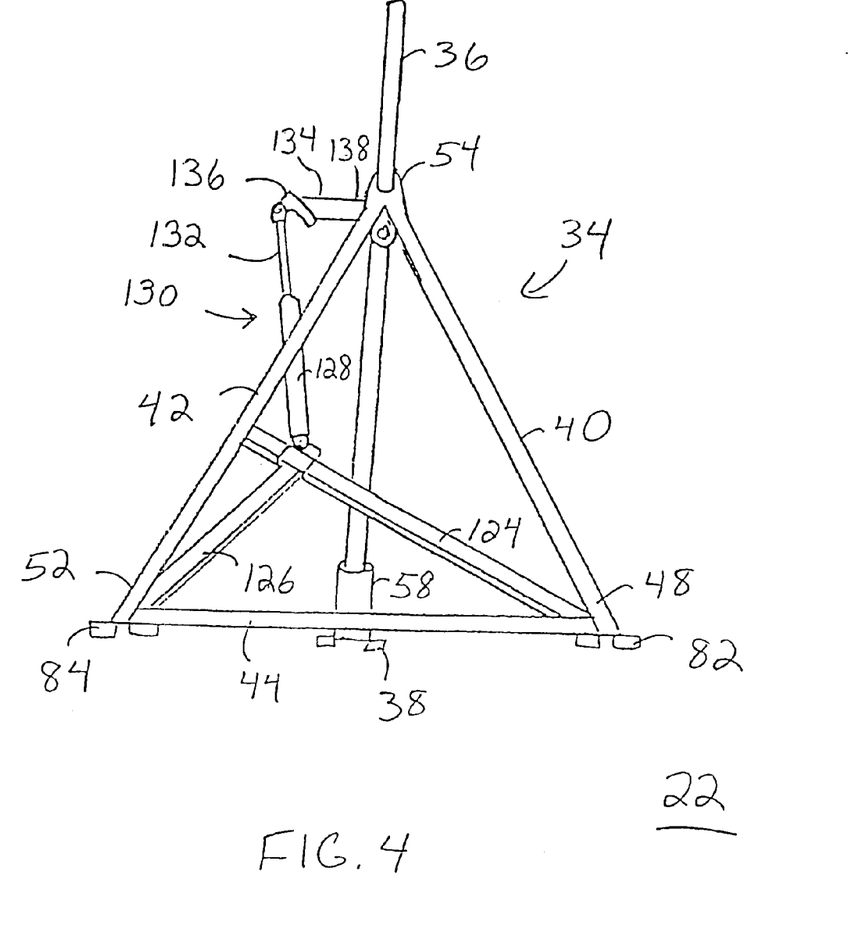
FIG. 4 shows an end view of the structure of FIG. 2.

Referring to FIG. 4 in connection with FIGS. 1–2, FIG. 4 shows an end view of structure 22. Structure 22 further includes a first support arm 124 welded to and extending from first leg end 48 of first leg 40 of frame 34. In particular, first leg end 48 and first support arm 124 are joined as a weldment with second foot member 82. First support arm 124 is further welded to an intermediate section of second leg 42. A second support arm 126 is welded to and extends from second leg end 52 of second leg 42 of frame 34. That is, second leg end 52 and second support arm 126 are joined as a weldment with third foot member 84. Second support arm 126 terminates at, and is coupled to first support arm 124.

First and second support arms 124 and 126, form a stable platform for connection of a body 128 of a drive mechanism 130. Drive mechanism 130 further includes a rod member 132 extendible from body 128. A torque arm 134, or torque lever, has a first arm end 136 coupled to rod member 132 and a second arm end 138 coupled to torque tube 36. In order to effect rotating motion of array 26, rod member 132 is extended from body 128 of drive mechanism 130, which pushes against torque arm 134, and subsequently enables westward rotation of torque tube 36 about longitudinal axis 64. Likewise, to effect eastward rotating motion of array 26, rod member 132 is retracted into body 128, which pulls torque arm 134 and subsequently enables eastward rotation of torque tube 36 about longitudinal axis 64. Drive mechanism 130 may be actuated by a timer that causes rod member 132 to extend or retract in response to the time of day. Alternatively, drive mechanism 130 may be in communication with a light sensor which actuates drive mechanism 132 in response to the direction of the sunlight.

Figures 5, 6:
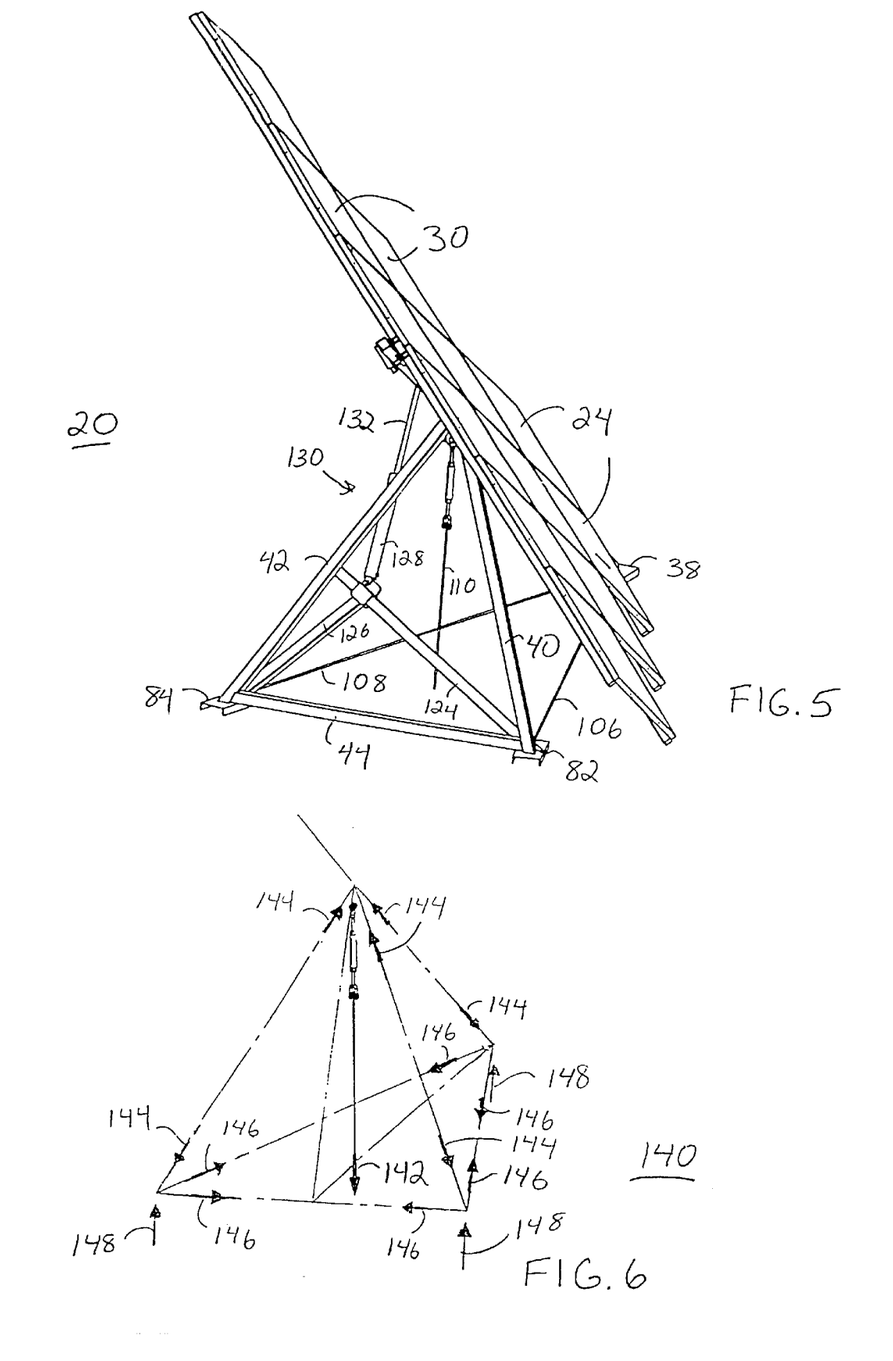
FIG. 5 shows a perspective view of photovoltaic (PV) modules of the tilted single-axis tracking system rotated to face afternoon sunlight.
FIG. 6 shows a diagram of compression and tension forces imposed on the structure of the tilted single-axis tracking system.

FIG. 5 shows a perspective view of PV modules 24 of tilted single-axis tracking system 20 rotated to face afternoon sunlight. As shown, rod member 132 is extended from body 128 of drive mechanism 130, and pushes against torque arm 134 (FIG. 4). Thus, torque tube 36 is rotated so that tracking surface 30 of PV modules 24 faces westward.

FIG. 6 shows a diagram of compression and tension forces imposed on structure 22 (FIG. 1) of tilted single-axis tracking system 20. As pre-tensioning member 110 is tensioned (represented by an arrow 142), bearing 56 (FIG. 1) at apex 54 (FIG. 1) bears against torque arm 134 (FIG. 4). Since torque arm 134 is attached to torque tube 36 (FIG. 4), torque tube 36 is subject to a compression force. The compression of torque tube 36 results in a compression force against bearing 62 (FIG. 1) of first foot member 38 (FIG. 1), and compression forces in each of first and second legs 40 and 42, respectively (FIG. 1), represented by arrows 144. Compression force 144 develops a tension force, represented by arrows 146 in first and second tensioning members 106 and 108, respectively (FIG. 1), and in base tensioning member 44 (FIG. 1). Tension force 146 is resolved back to first and second legs 40 and 42, respectively, (FIG. 1) of frame 34 (FIG. 1).

As pre-tensioning member 110 is tensioned, pulling down on apex 54 of frame 34, torque tube 36 and first and second legs 40 and 42 are preloaded in pure compression. The compression in these elements is resisted by pure tension developed in first and second tensioning members 106 and 108, and in base tensioning member 44. These compression and tension forces in turn develop foundation reactions, represented by arrows 148 at each of first, second, and third foot members 38, 82, and 84 (FIG. 1) that hold structure 22 to surface 28.

The cooperative relationship between torque tube 36, frame 34, ground anchor 118 of pre-tensioning member 110, and first and second tensioning members 106 and 108 causes a balance of compression force 144, tension force 146, and foundation reaction 148. This balance produces an efficient load transfer scheme that allows for the attachment of structure 22 (FIG. 1) to surface 28 (FIG. 1) via a single attachment point (i.e., ground anchor 118). This simple ground anchor attachment eliminates the need for any other foundation elements, significantly decreasing the installation complexity and cost of system 20 (FIG. 1).

Furthermore, as wind loads develop torque in torque tube 36, that torque is converted to bending stresses in torque arm 134 (FIG. 4), and tension or compression in rod member 132 (FIG. 4) of drive mechanism 130 (FIG. 4). The tension or compression forces in rod member 132 are resolved into pure tension or compression loads in first and second support arms 124 and 126, respectively, which carry those loads to first, second, and third foot members 38, 82, and 84. Thus, as long as pre-tensioning member 110 is maintained under tension, any vertical wind load that is later imposed on array 26 by wind conditions results in either an increase or decrease in foundation reactions 148. The vertical foundation reactions 148 also contribute to the development of ground horizontal friction forces at first, second, and third foot members 38, 82, and 84 that resist lateral wind loads.

Figure 7:
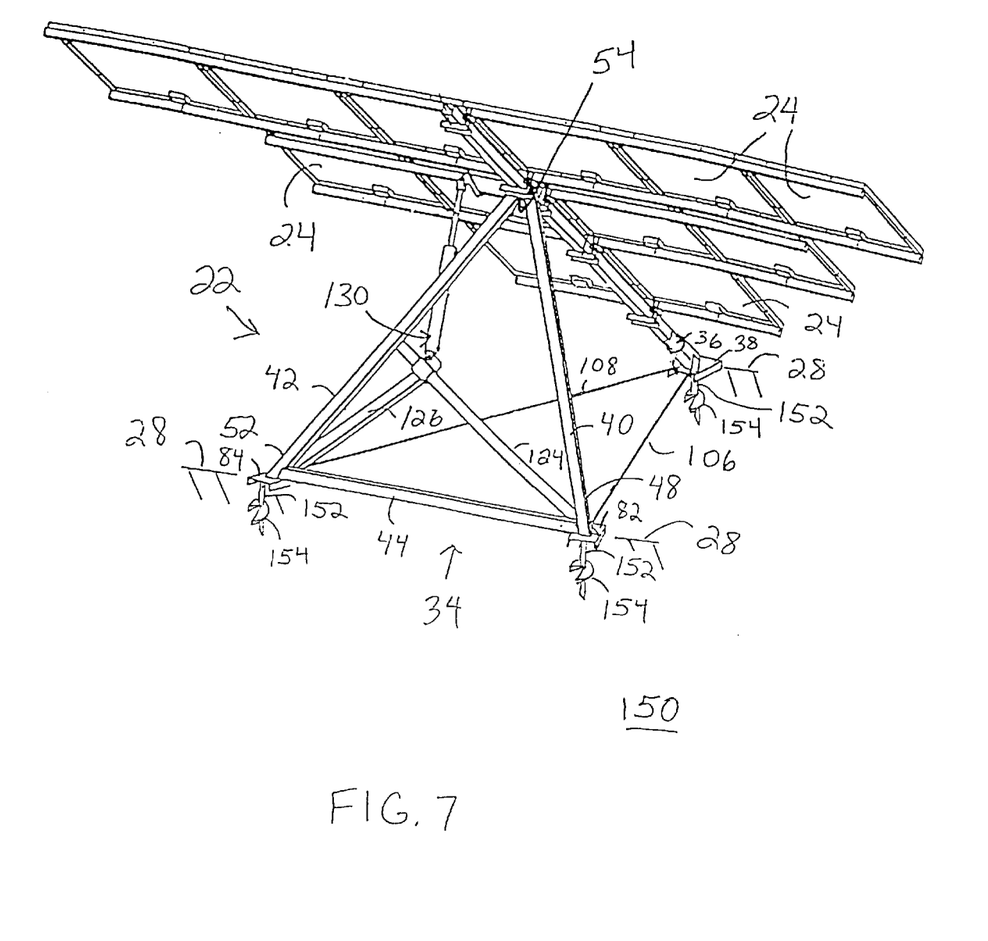
FIG. 7 shows a perspective view of a tilted single-axis tracking system in accordance with an alternative embodiment of the present invention.

FIG. 7 shows a perspective view of a tilted single-axis tracking system 150 in accordance with an alternative embodiment of the present invention. System 150 is similar to tilted single-axis tracking system 20 (FIG. 1) in that system 150 generally includes PV modules 24 and support structure 22. Support structure 22 of system 150 includes frame 34, torque tube 36, first foot member 38, first tensioning member 106, and second tensioning member 108. In addition, system 150 also includes first support arm 124, second support arm 126, drive mechanism 130, and torque arm 134 (FIG. 4). For brevity, further description of the elements common to both system 20 and system 150 will not be repeated herein.

Unlike system 20, tilted single-axis tracking system 150 does not include pre-tensioning member 110 (FIG. 1) extending from apex 54 of frame 34. Rather, tilted single-axis tracking system 150 includes pre-tensioning members 152 extending from first leg 40, second leg 42, and first foot member 38 that are configured for attachment to surface 28. More specifically, one of pre-tensioning members 152 is coupled to second foot member 82, which is coupled to first leg end 48 of first leg 40. Similarly, a second one of pre-tensioning members 152 is coupled to third foot member 84, which is coupled to second leg end 52 of second leg 42. In addition, a third one of pre-tensioning members 152 is coupled to first foot member 38.

Pre-tensioning members 152 include ground anchors 154 for securing each of pre-tensioning members 152 to surface 28. A cooperative relationship between torque tube 36, frame 34, ground anchors 154 of pre-tensioning members 152, and first and second tensioning members 106 and 108 causes a balance of compression, tension, and foundation reaction forces. Like system 20, this balance of forces produces an efficient load transfer scheme that allows for the attachment of structure 22 of system 150 to surface 28 via three simple ground anchor attachments. The simple ground anchor attachments eliminate the need for any other foundation elements, particularly large concrete footings, which significantly decreases the installation complexity and cost of system 150 relative to conventional structures.

In summary, the present invention teaches of a structure for supporting photovoltaic modules in a solar energy collection system. The cooperative relationship between the torque tube, the frame, the first and second tensioning members, and the pre-tensioning member or members, causes a balance of compression force, tension force, and foundation reaction that leads to an efficient transfer of structural loads to the ground. This balance of forces results in a structure that effectively supports an array of PV modules having a tracking surface area in excess of two hundred square feet, which provides sufficient solar energy collection capacity for many remote and single residence applications. Moreover, this efficient transfer of structural loads is stable under both vertical and horizontal wind loads. In addition, the simple construction of the structure enables the installation of the tilted single-axis tracking system during a single site visit with conventional equipment, requiring little site preparation and excavation, and with a minimum of personnel. The simplicity of construction and ease of installation decreases overall costs, and encourages greater use of arrays of photovoltaic modules as an economical source of electrical power.

Although the preferred embodiments of the invention have been illustrated and described in detail, it will be readily apparent to those skilled in the art that various modifications may be made therein without departing from the spirit of the invention or from the scope of the appended claims. For example, the nature of construction of the photovoltaic arrays and photovoltaic modules is not critical to the invention.

What is claimed is:

1. A structure for supporting an energy conversion module above a surface, said structure comprising:
    a frame having a first leg, a second leg, and a base tensioning member, said first and second legs configured to extend upwardly from said surface and join at an apex, and said base tensioning member being interposed between said first and second legs;
    a torque tube pivotally retained by said frame at said apex and configured for attachment of said energy conversion module;
    a foot member for rotatably retaining a tube end of said torque tube and configured to contact said surface;
    a first tensioning member coupled between said foot member and said first leg;
    a second tensioning member coupled between said foot member and said second leg; and
    a pre-tensioning member extending from said apex of said frame and configured for attachment to said surface.

2. A structure as claimed in claim 1 wherein:
    said first leg includes a first leg end;
    said second leg includes a second leg end; and
    said base tensioning member includes first and second ends, said first end being coupled to said first leg end and said second end being coupled to said second leg end.

3. A structure as claimed in claim 1 wherein a first leg end of said first leg and a second leg end of said second leg are configured to rest on said surface.

4. A structure as claimed in claim 1 wherein said foot member is a first foot member, and said frame further comprises:
    a second foot member coupled to a first leg end of said first leg; and
    a third foot member coupled to a second leg end of said second leg, said second and third foot members providing friction between first and second legs of said frame and said surface.

5. A structure as claimed in claim 4 wherein:
    said second foot member is a first channel section having a first base coupled to said first leg end and having first and second sides extending from longitudinal edges of said first base, said first and second sides being configured to extend toward said surface; and
    said third foot member is a second channel section having a second base coupled to said second leg end and having third and fourth sides extending from longitudinal edges of said second base, said third and fourth sides being configured to extend toward said surface.

6. A structure as claimed in claim 5 wherein:
    said first channel section exhibits a longitudinal dimension axially aligned with said first tensioning member; and
    said second channel section exhibits said longitudinal dimension axially aligned with said second tensioning member.

7. A structure as claimed in claim 1 wherein said foot member is a channel section having first and second sides extending from longitudinal edges of a base, said first and second sides being configured to extend toward said surface.

8. A structure as claimed in claim 1 wherein:
    said first tensioning member is coupled between said foot member and a first leg end of said first leg; and
    said second tensioning member is coupled between said foot member and a second leg end of said second leg.

9. A structure as claimed in claim 1 wherein each of said first and second tensioning members is a rod.

10. A structure as claimed in claim 1 wherein said pre-tensioning member is configured to extend approximately vertically relative to horizontal.

11. A structure as claimed in claim 1 wherein said pre-tensioning member includes a ground anchor for securing said pre-tensioning member to said surface.

12. A structure as claimed in claim 1 further comprising:
    a first support arm coupled to and extending from a first leg end of said first leg of said frame, said first support arm being further coupled to said second leg;
    a second support arm coupled to and extending from a second leg end of said second leg of said frame, said second support arm being further coupled to said first support arm;
    a drive mechanism having a body and a rod member extendible from said body, said body being coupled to one of said first and second support arms; and
    a torque arm having a first arm end coupled to said rod member and having a second arm end coupled to said torque tube, wherein extension of said rod member from said body of said drive mechanism enables rotation of said torque tube, via said torque arm, about a longitudinal axis of said torque tube.

13. A structure as claimed in claim 1 wherein:
    said apex of said frame exhibits a first height relative to said surface; and
    said foot member includes a receptacle for said tube end of said torque tube, said receptacle exhibiting a second height relative to said surface, said second height configured to be less than said first height so that a plane of said energy conversion module is inclined relative to horizontal.

14. A structure for supporting an energy conversion module above a surface, said structure comprising:
    a frame having a first leg, a second leg, and a base tensioning member, said first leg having a first leg end, said second leg having a second leg end, said first and second legs being configured to rest on and extend upwardly from said surface to join at an apex, and said base tensioning member being interposed between said first leg end of said first leg and said second leg end of said second leg;
    a torque tube pivotally retained by said frame at said apex and configured for attachment of said energy conversion module;
    a foot member for rotatably retaining a tube end of said torque tube and configured to rest on said surface;
    a first tensioning member coupled between said foot member and said first leg;
    a second tensioning member coupled between said foot member and said second leg; and
    a pre-tensioning member extending from said apex of said frame and configured for attachment to said surface, said attachment of said pre-tensioning member to said surface establishing a single attachment point of said structure to said surface, and said pre-tensioning member being configured to extend approximately vertically relative to horizontal.

15. A structure as claimed in claim 14 wherein said pre-tensioning member includes a ground anchor for securing said pre-tensioning member to said surface.

16. A structure as claimed in claim 14 wherein said foot member is a first foot member, and said frame further comprises:
 a second foot member coupled to a first leg end of said first leg; and
 a third foot member coupled to a second leg end of said second leg, said second and third foot members providing friction between first and second legs of said frame and said surface.

17. A solar energy collection system comprising:
 an array of energy collection modules, said array exhibiting a tracking surface having a surface area of at least two hundred square feet; and
 a structure for supporting said array of energy conversion modules above a surface, said structure comprising:
  a frame having a first leg, a second leg, and a base tensioning member, said first and second legs configured to extend upwardly from said surface and join at an apex, and said base tensioning member being interposed between said first and second legs;
  a torque tube pivotally retained by said frame at said apex and configured for attachment of said energy conversion module;
  a foot member for rotatably retaining a tube end of said torque tube and configured to contact said surface;
  a first tensioning member coupled between said foot member and said first leg;
  a second tensioning member coupled between said foot member and said second leg; and
  a pre-tensioning member extending from said apex of said frame and configured for attachment to said surface.

18. A solar energy collection system as claimed in claim 17 wherein:
 said apex of said frame exhibits a first height relative to said surface; and
 said foot member includes a receptacle for said tube end of said torque tube, said receptacle exhibiting a second height relative to said surface, said second height configured to be less than said first height so that a plane of said energy conversion module is inclined relative to horizontal.

19. A solar energy collection system as claimed in claim 17 wherein said structure further comprises:
 a first support arm coupled to and extending from a first leg end of said first leg of said frame, said first support arm being further coupled to said second leg;
 a second support arm coupled to and extending from a second leg end of said second leg of said frame, said second support arm being further coupled to said first support arm;
 a drive mechanism having a body and a rod member extendible from said body, said body being coupled to one of said first and second support arms; and
 a torque arm having a first arm end coupled to said rod member and having a second arm end coupled to said torque tube, wherein extension of said rod member from said body of said drive mechanism enables rotation of said torque tube and said array of energy conversion modules, via said torque arm, about a longitudinal axis of said torque tube.

* * * * *